United States Patent Office 2,781,268
Patented Feb. 12, 1957

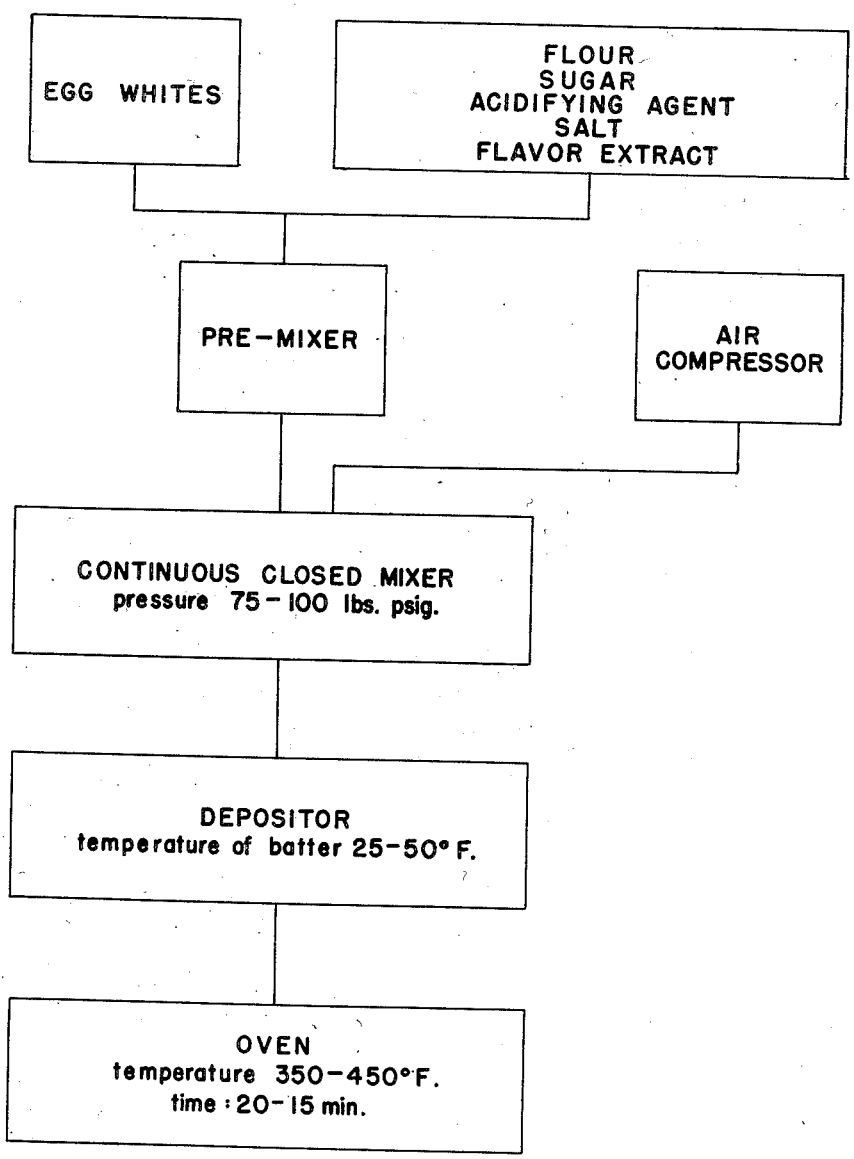

2,781,268
METHOD OF PRODUCING ANGEL FOOD BATTER AND CAKE

John A. Abbott, Jr., South San Francisco, Calif., Duffer B. Crawford, Westfield, N. J., and Kerwood M. Kelly, Omaha, Nebr., assignors to American Machine & Foundry Company, a corporation of New Jersey Application September 10, 1954, Serial No. 458,522
(Filed under Rule 47(b) and 35 U. S. C. 118)

21 Claims. (Cl. 99—92)

This is a continuation-in-part of our application, Serial No. 255,044 filed November 6, 1951, and now abandoned.

This invention relates to the production of angel food cake and angel food cake batter. More specifically, we have devised a novel process and formulation for preparing the batter for such cake and for cooking this batter. Batter and cake prepared according to our method and formulation differs substantially from conventional batters and cakes heretofore made. For example, our batter has a stiff dry peak, whereas it is well known in the art that good angel food batters have a soft wet peak. The "peak" of a batter is the formation produced by moving an object such as the finger into and out of the batter. Soft peaks topple, whereas a stiff peak maintains its form. Moreover, the baking time with our batter is relatively short as compared with the time for conventional batters and the temperature of the bake is relatively high as compared to preferred conventional bake temperatures.

It is an object of our invention to produce a superior angel food cake and cake batter by continuous mixing means and, moreover, to produce this batter by simultaneously mixing all of the ingredients of the batter. It is well known to bakers that angel food cake batter must be prepared by whipping the egg whites first and then folding in the flour. In the past all efforts to add the flour before whipping the egg whites have failed for the reason that the egg whites will not froth in the presence of flour.

In making batter and cake by our method we believe that the usual leavening or gasifying agents here serve principally as acidifying agents. It is well known that egg whites have an initial pH of about 9 but foam better in the acid range. We have found that cream of tartar makes an excellent acidifying agent; also Fleischman's Tart-O-Cream gives excellent results. Tart-O-Cream, as stated on its label, contains calcium acid phosphate, calcium sulphate, fumaric acid and starch. Several other well known substitutes have also been found to work though some of them apparently are slower to reduce acidity and it is occasionally preferable to dissolve these in advance in warm water before adding to the pre-mix.

In carrying out our novel process we have employed the following 30-30-10 formula, as well as some variations wherein about 10% of the flour was replaced by corn-starch to give in effect a flour weaker in protein:

30 lbs. egg white
30 lbs. sugar
10 lbs. flour
7½ oz. cream of tartar
7½ oz. salt In practice, a suitable flavoring agent may be used. We have found that glycerine-free extracts give satisfactory results.

We pre-mix these ingredients simultaneously in any suitable manner, such as a conventional batch mixer. However, unless the batter is to be placed almost immediately into the oven, it must at all times remain at a very cold temperature, below 45° F. In order to accomplish this temperature, the egg white should initially be ice-frozen or nearly so. We then introduce this very cold pre-mix with compressed air into a closed continuous mixer at a high pressure, 75–100 p. s. i. g. For this operation, we employ a continuous mixer of the type shown in U. S. Patent 2,572,049. The mix, which leaves the mixer at a temperature between 30–40° F., is gradually conducted from the mixer in an expanding nozzle and deposited in baking pans within 30 minutes and inserted into a 350°–450° baking oven and baked for about 15 minutes.

With conventional angel food cake batters specific gravity seldom is below 0.35. A slow bake is required to raise the batter, whereas with our method a very low specific gravity of 0.25 is obtained at the time of the mixing and a fast bake is necessary to "set" the batter. That is to say, conventional angel food cake batters do rise during cooking hence require a low temperatured, slow bake, whereas our batter has already substantially expanded before it enters the oven and must be baked rapidly to prevent collapse.

Referring to the accompanying flow sheet drawing, we show the material storage including the egg whites preferably in a frozen or near frozen condition. These ingredients are then mixed in a pre-mixer. We have employed a batch pre-mixer but it is evident that pre-mixing may be done in any fashion, provided a low temperature range is maintained. This pre-mixed batter is then fed under pressure with compressed air or other suitable gas into a closed continuous mixer. The batter emerges from the continuous mixer at a temperature not exceeding 40–50° F. It should be here noted that conventional batters are finished at 60–65° F. Our method will not tolerate such high temperatures unless the mixed batter can be placed almost immediately into the oven. Since it is usual for batters to have about one-half hour floor time it must be maintained at about a 40° temperature. At this stage the batter has the peculiar characteristic noted above of a stiff dry peak. It must then be promptly deposited in pans and baked fast in a hot oven at a temperature of 350–450° F. Although we do not know precisely why this high temperature is required, it would appear that it "sets" the highly aerated fragile foam.

The resulting angel cake has proved superior to conventional angel cake and excels in the following characteristics: (a) lower specific gravity (greater volume per pound); (b) extremely fine texture; (c) very tender feel in the mouth; (d) improved shelf life; and (e) more moist—not nearly as dry as conventional cake.

We claim:

1. The process of making angel food cake comprising simultaneously pre-mixing all the ingredients of angel food cake to form a pre-mix, reducing the pH of said pre-mix, introducing said pre-mix under high pressure into an area of intense agitation to form a mix, maintaining said mix at a temperature range not exceeding 50° F., and conducting said mix gradually from said area of intense agitation and into a bake oven having a temperature in excess of 350° F. to form angel food cake.

2. The process of making angel food cake comprising employing a formula including frozen egg whites, flour, sugar, glycerine-free flavoring extract, and cream of tartar in predetermined proportions, simultaneously pre-mixing said ingredients and introducing said pre-mix under high pressure and with a compressed gas into an area of intense agitation, maintaining said mix at a temperature range of 20–50° F., and conducting said mix gradually from said area of intense agitation while it is at a temperature not exceeding 50° F. to a baking oven having a temperature in excess of 350° F.

3. The method of making angel food cake in a closed continuous mixer comprising simultaneously whipping all the egg whites, sugar and flour ingredients of the angel food cake in a closed mixer at a low temperature not exceeding 40° F. to produce a batter characterized by a dry stiff peak and then promptly baking said batter at a temperature in excess of 350° F.

4. The method of producing angel food cake comprising pre-mixing a predetermined quantity of frozen egg whites, sugar, flour, salt, cream of tartar, and glycerine-free flavoring extract, introducing said pre-mix with air into a confined area at a pressure exceeding 75 lbs. p. s. i. g., intensely agitating said mix while in said area, conducting said mix from said area at a temperature not exceeding 50° F. and then rapidly baking said mix at a temperature in excess of 350° F.

5. The method of producing an article of food comprising pre-mixing the following ingredients in substantially the following parts by weight; 1 part frozen egg whites, 1 part sugar, ⅓ part flour, 1/64 part cream of tartar, 1/64 part salt; introducing said pre-mix with air into a confined area at a pressure exceeding 75 lbs. p. s. i. g., intensely agitating said mix while in said area, removing said mix from said area while it is at a temperature not exceeding 45° F., and then rapidly baking said mix at a temperature in excess of 350° F.

6. The method of producing an article of food comprising pre-mixing the following ingredients in substantially the following parts by weight; 1 part frozen egg whites, 1 part sugar, ⅓ part flour, 1/64 part cream of tartar, 1/64 part salt; introducing said pre-mix with air into a confined area at a pressure exceeding 75 lbs. p. s. i. g., intensely agitating said mix while in said area, removing said mix from said area while it is at a temperature not exceeding 45° F., and baking said mix.

7. The method of producing angel food cake batter comprising simultaneously pre-mixing all of the ingredients of angel food cake, introducing said pre-mix in a chilled condition under high pressure and with a compressed gas into an area of intense agitation, and maintaining said mix at a cold temperature range.

8. The method of producing angel food cake batter comprising pre-mixing a predetermined quantity of frozen egg whites, sugar, flour, salt, flavoring extract and an acidifying ingredient, introducing said pre-mix with air into a confined area at a pressure exceeding 75 lbs. p. s. i. g., intensely agitating said mix while in said area, and then gradually conducting said mix from said area of intense agitation at a temperature not exceeding 50° F. to ambient pressure.

9. The method of producing angel food cake comprising pre-mixing a predetermined quantity of chilled egg whites, sugar, flour, salt, and an acidifying ingredient, introducing said pre-mix with compressed air into a confined pressure area, intensely agitating said mix at a temperature not exceeding 50° F. while in said area, and then gradually conducting said mix from said area of intense agitation to ambient pressure and promptly baking in a hot oven at a temperature exceeding 350° F.

10. The method set forth in claim 8 wherein the acidifying ingredient is cream of tartar.

11. The method set forth in claim 8 in which the acidifying ingredient is an organic acid.

12. The method set forth in claim 8 in which the acidifying ingredient is an acid salt.

13. The method set forth in claim 8 in which the acidifying ingredient is fumaric acid.

14. The method set forth in claim 8 in which the acidifying ingredient is tartaric acid.

15. The method set forth in claim 8 in which the acidifying ingredient is an acid salt of tartaric acid.

16. The method set forth in claim 8 in which the acidifying ingredient is an acid phosphate salt.

17. The method set forth in claim 8 in which the acidifying ingredient is calcium sulphate.

18. The method of producing angel food cake batter comprising pre-mixing a predetermined quantity of frozen egg whites, sugar, flour and at least one acid ingredient and introducing said pre-mix with air into a confined area at a pressure exceeding 75 pounds p. s. i. g., intensely agitating said mix while in said area, maintaining said mix at a temperature range not exceeding 50° F. and then gradually conducting said mix from said area of intense agitation at a temperature not exceeding 50° F. to ambient pressure.

19. The process of making angel food cake batter comprising mixing a composition from frozen egg whites, flour and sweetening agent in predetermined proportions, reducing the pH of said composition, introducing said composition under pressure and with a compressed gas into an area of agitation to form a mix, maintaining said mix at a temperature range not exceeding 50° F., conducting said mix from said area of agitation while it is at a temperature not exceeding 50° F., and maintaining said mix at a temperature not exceeding 50° F. to form a batter.

20. The process of making angel food cake comprising pre-mixing a predetermined quantity of egg whites, sugar, flour and at least one acid ingredient and introducing said pre-mix under high pressure and with a compressed gas into an area of intense agitation, maintaining said mix in a temperature range of 20–50° F., and then conducting said mix gradually from said area of intense agitation while it is at a temperature not exceeding 50° F. to a baking oven having a temperature in excess of 350° F.

21. The method of producing angel food cake batter comprising pre-mixing a predetermined quantity of egg whites, sugar, flour and at least one acid ingredient and introducing said pre-mix under high pressure and with a compressed gas into an area of intense agitation, intensely agitating said mix while in said area, maintaining said mix at a temperature range not exceeding 50° F., and then gradually conducting said mix from said area of intense agitation at a temperature not exceeding 50° F. to ambient pressure.

References Cited in the file of this patent

UNITED STATES PATENTS

| | | |
|---|---|---|
| 2,524,437 | Garnatz | Oct. 3, 1950 |
| 2,648,606 | Lloyd | Aug. 11, 1953 |

OTHER REFERENCES

Lowe: Experimental Cookery, 1932, John Wiley and Sons, Inc. (article pp. 355–372), pp. 349, 355, 360, 362, 372, and 448 relied upon.

De Gouy: The Gold Cook Book, Greenberg, N. Y., pp. 908–911.